A. McINTOSH.
WASH BOWL AND BASIN TRAP.
APPLICATION FILED JUNE 28, 1910.
977,319.
Patented Nov. 29, 1910.
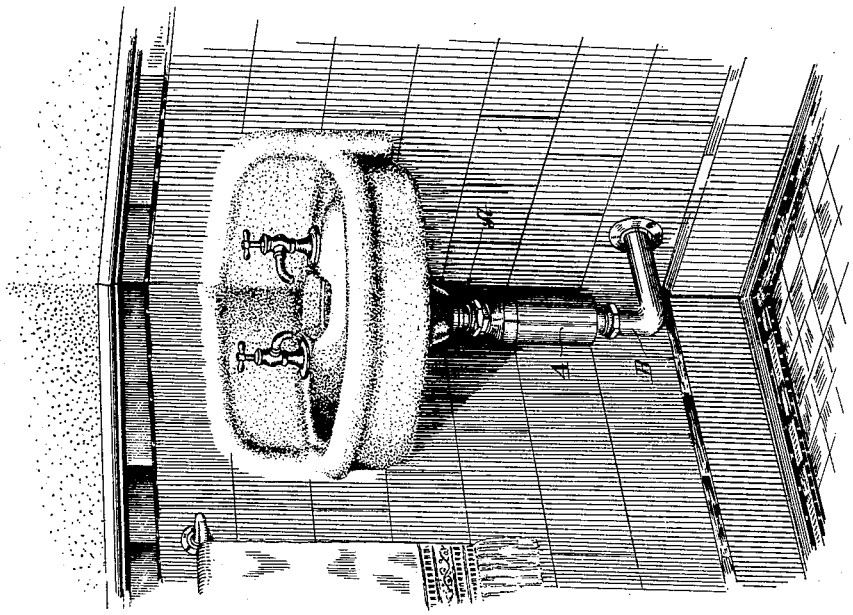
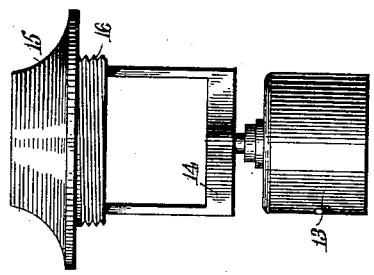
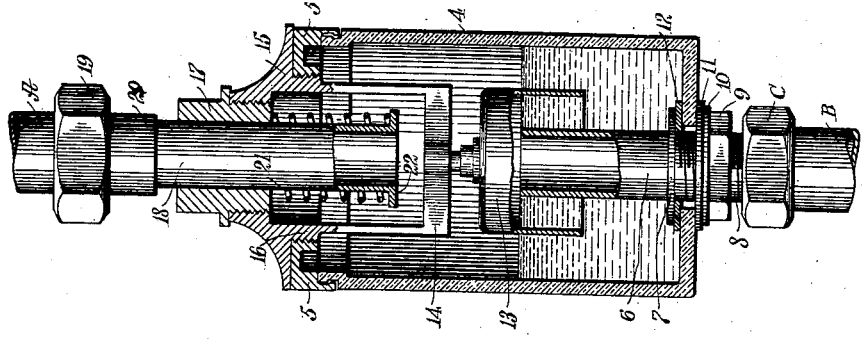
WITNESSES:
INVENTOR
Adam McIntosh
BY
ATTORNEYS ved, that the interior

UNITED STATES PATENT OFFICE.

ADAM McINTOSH, OF GREEN ISLAND, NEW YORK.

WASH BOWL AND BASIN TRAP.

977,319. Specification of Letters Patent. Patented Nov. 29, 1910.

Application filed June 28, 1910. Serial No. 569,321.

*To all whom it may concern:*

Be it known that I, ADAM McINTOSH, a citizen of the United States, and a resident of Green Island, in the county of Albany and State of New York, have invented a new and Improved Wash Bowl and Basin Trap, of which the following is a full, clear, and exact description.

Among the principal objects which the present invention has in view are: to provide a trap the construction whereof permits a quick and ready separation for cleaning or repair; to provide a trap section whereby the sediment or clogging material can be seen; and to provide a connection resilient in character to relieve the pressure on the bowl or basin to which traps of the character set forth are attached.

One embodiment of the present invention is disclosed in the structure illustrated in the accompanying drawings, in which like characters of reference denote corresponding parts in all the views, and in which—

Figure 1 is a vertical section of a trap constructed and arranged in accordance with the present invention, and showing in connection therewith fragments of the pipe system; Fig. 2 is a side view in detail of the trap cover and structural connection therewith; and Fig. 3 is a pictorial view in perspective showing the adaptation of a trap of the character described to a washbowl and drain pipe.

The trap herein described embodies a cylinder 4, which is constructed from glass, preferably transparent, that the interior thereof may be viewed. The cylinder 4 is suitably provided with a metal head 5, the junction between the head and the glass body being properly cemented. The cylinder 4 is provided with a bottom portion, in the center whereof is formed a perforation to receive a nipple 6. The nipple 6 is provided with a fixed flange 7 and a screw threaded extension 8. The nipple is secured rigidly in position by a screw nut 9, between the flange 10 whereof and the body of the glass cylinder is interposed a rubber or other suitable washer 11. A similar washer 12 is introduced between the glass of the bottom of the cylinder 4 and the flange 7. With this construction, when the nut 9 is set up hard against the washer 11, the two washers 11 and 12 yield and hermetically seal the joint about the nipple 6. The nipple 6 is extended within the cylinder 4, and within an inverted cup-shaped cover 13. The cover 13 is provided with solid side and top walls, and is suspended within the cylinder 4 by a yoke 14. The yoke 14 has cross head members and vertical arms integrally connected with a cap nut 15 which screws upon and forms an hermetically sealed joint with the head 5. To receive the cap nut 15 the head 5 is perforated, and the perforation is provided with a suitable screw thread to receive the screw threads formed on a central neck extension 16 of the said cap nut. The cap nut 15 is centrally perforated, and the perforation is tapped to receive a perforated nut 17. The nut 17 is provided with a suitable central perforation to receive in sliding relation a pipe nipple 18.

The trap thus constructed is connected to the drain pipe A and the waste pipe B, forming part of the structure of the basin and the plumbing system, respectively. In forming this connection the threaded extension 8 of the nipple 6 is united to the waste pipe B by a suitable swivel nut C. The nipple 18 is attached to the drain pipe A by means of a swivel nut 19, which is permanently and loosely attached to the said nipple 18, the upper edge of the section 20 thereof being coned to seat within the lower opening of the pipe A in a manner common to connections of this character.

To relieve the pulling strain of the plumbing and the trap upon the drain pipe A, and the basin connected therewith, I have slidably mounted the nipple 18 in the nut 17 as shown in Fig. 1 of the drawings. This connection permits of the adjustment vertically of the nipple 18 to meet all the requirements or variation in the measurements of the pipes, and the accumulation of the fall of the drain pipe A with relation to the waste pipe B. Where it is desired that the waste pipe B shall be supported I have provided a spiral spring 21, which is extended around the body of the nipple 18 to rest upon a flange 22 formed at the lower end thereof, and which spring is interposed between the said flange 22 and the under surface of the nut 17. When thus installed the spring 21 exerts a constant pressure upward on the nut 17, and thereby lifts the trap structure and the pipe B supporting the same upon the drain pipe A and the basin structure connected therewith.

When in the course of operation it becomes necessary to clean or free the trap, this is accomplished by unscrewing the nut 19 and the cap nut 15. The releasing of the nut 19 permits the nipple 18 to extend within the cylinder 4 and to free the upper end of the section 20 of the said nipple from engagement with the pipe A. By removing the cap nut 15 from the cylinder 4 the cover 13 and supporting structure therefor are removed from said cylinder. The perforation in the head 5 is sufficiently large to receive any tools for cleaning or lifting from the cylinder 4 all sediment or clogging material collected therein. The cylinder 4 having been cleaned or cleared, the cap nut 15 and cover 13 connected therewith are replaced in the manner above described, and as shown in Fig. 1 of the drawings. The cap nut having been secured upon the head 5, the nipple 18 is extended upward until the nut 19 engages with the pipe A and is screwed firmly thereon.

It will be seen that the cover 13, extending as described and shown over the upper end of the nipple 6, forms a perfect water seal to prevent the passage from the pipe B of the sewer gases delivered to the said cover 13 and accumulated thereunder. The walls of the cover 13 are depressed sufficiently to provide a dam to prevent the passage under the said walls of the gases. When, however, it is desired, an escapement pipe may be connected with the top of the cover 13 and carried upward through the cap nut 15 to the escapement pipe usually provided in plumbing systems, whereby the gases thus trapped are led away and dispersed into the open air.

Having thus described my invention, what I claim as new and desire to secure by Letters Patent is:—

1. A washbowl and basin trap, comprising a cylinder having a delivery pipe extended from the bottom thereof and adapted to be fixedly attached to the waste pipe of the sewer system; a cap for said cylinder having depended therefrom an inverted cup-shaped cover to extend over and infold the upper end of said delivery pipe to form a water seal therewith; a sliding pipe section mounted in said cap and adapted to be secured to the drain pipe of a plumbing fixture; and a resilient member connected with said sliding pipe section, said member adapted to support the said trap on said sliding pipe section.

2. A washbowl and basin trap, comprising a cylinder having a delivery pipe extended from the bottom thereof and adapted to be fixedly attached to the waste pipe of the sewer system; a cap for said cylinder having depended therefrom an inverted cup-shaped cover to extend over and infold the upper end of said delivery pipe to form a water seal therewith; a sliding pipe section mounted in said cap and adapted to be secured to the drain pipe of a plumbing fixture; and a spiral spring mounted on said sliding pipe section to support the trap thereon.

3. A washbowl and basin trap, comprising a transparent glass cylinder having a delivery pipe extended from the bottom thereof and adapted to be fixedly attached to the waste pipe of the sewer system; a cap for said cylinder having depended therefrom an inverted cup-shaped cover to extend over and infold the upper end of said delivery pipe to form a water seal therewith; a sliding pipe section mounted in said cap and adapted to be secured to the drain pipe of a plumbing fixture; and a resilient member connected with said sliding pipe section, said member adapted to support the said trap on said sliding pipe section.

4. A washbowl and basin trap, comprising a transparent glass cylinder having a delivery pipe extended from the bottom thereof and adapted to be fixedly attached to the waste pipe of the sewer system; a cap for said cylinder having depended therefrom an inverted cup-shaped cover to extend over and infold the upper end of said delivery pipe to form a water seal therewith; a sliding pipe section mounted in said cap and adapted to be secured to the drain pipe of a plumbing fixture; and a spiral spring mounted on said sliding pipe section to support the trap thereon.

In testimony whereof I have signed this specification in the presence of two subscribing witnesses.

ADAM McINTOSH.

Witnesses:
JOSEPH E. McNARY,
WALTER F. VAN GUYSLING.